(12) United States Patent
Barbosa

(10) Patent No.: US 10,342,084 B1
(45) Date of Patent: Jul. 2, 2019

(54) OSCILLATING DRIVER CIRCUITS

(71) Applicant: New Energies & Alternative Technologies, Inc., Albuquerque, NM (US)

(72) Inventor: Issac Ananda Barbosa, Albuquerque, NM (US)

(73) Assignee: New Energies & Alternative Technologies, Inc., Albuquerque, NM (US)

( * ) Notice: Subject to any disclaimer, the term of this patent is extended or adjusted under 35 U.S.C. 154(b) by 0 days.

(21) Appl. No.: 16/149,696

(22) Filed: Oct. 2, 2018

(51) Int. Cl.
*H02J 7/00* (2006.01)
*H05B 33/08* (2006.01)

(52) U.S. Cl.
CPC ........ *H05B 33/0827* (2013.01); *H02J 7/0068* (2013.01)

(58) Field of Classification Search
None
See application file for complete search history.

(56) References Cited

U.S. PATENT DOCUMENTS

| | | | |
|---|---|---|---|
| 9,441,799 B2 | 9/2016 | Miller | |
| 9,473,020 B2 | 10/2016 | Smith | |
| 2014/0300274 A1* | 10/2014 | Acatrinei | H05B 33/0815 315/85 |
| 2015/0296586 A1* | 10/2015 | Williams | H05B 37/0245 315/161 |
| 2015/0308640 A1 | 10/2015 | Miller | |

(Continued)

FOREIGN PATENT DOCUMENTS

| | | |
|---|---|---|
| DE | 202011106116 | 11/2011 |
| DE | 102014103191 A | 9/2014 |

(Continued)

OTHER PUBLICATIONS

'easy-electronics4u.blogspot.com' [online]. "Charge your non-rechargeable Alkaline batteries (new method)," Published on Feb. 8, 2012, [retrieved on Oct. 8, 2018], retrieved from the Internet: URL:<http://easy-electronics4u.blogspot.com/2012/02/charge-your-non-rechargeable-alkaline.html>. 4 pages.

(Continued)

*Primary Examiner* — Jimmy T Vu
*Assistant Examiner* — Laura Yesildag
(74) *Attorney, Agent, or Firm* — Fish & Richardson P.C.

(57) ABSTRACT

In some implementations, a device includes first terminals to couple with a first battery arranged to supply power to the device, including a positive terminal and a negative terminal. The device includes a first winding and a second winding that are arranged to be inductively coupled. The device includes a transistor. The first winding and the second winding are coupled to the positive terminal with opposite polarity. The device includes a light emitting diode (LED) and second electrical contacts to couple with a second battery to be charged by the device. The device is arranged to couple the LED and the second battery in series with each other, with the LED and second battery being coupled in parallel with the second winding. The LED is arranged to be reverse biased with respect to the first battery and the second battery.

20 Claims, 5 Drawing Sheets

(56) References Cited

U.S. PATENT DOCUMENTS

2016/0330811 A1* 11/2016 Wang .............. H05B 33/0815

FOREIGN PATENT DOCUMENTS

RU           173806 U1     9/2017
WO    WO2018065077 A1    4/2018

OTHER PUBLICATIONS

'electronics-diy.com' [online]. "Make: Weekend Projects, Make a Joule Thief," Published on or before Oct. 1, 2018, [retrieved on Oct. 8, 2018], retrieved from the Internet: URL:<http://electronics-diy.com/schematics/573/wp_joule_thief.pdf>. 3 pages.

'en.wikipedia.org' [online]. "Joule Thief," last updated on May 22, 2018, [retrieved on Oct. 5, 2018], retrieved from the Internet: URL:<https://en.wikipedia.org/wiki/Joule_thief. 6 pages.

Haidar, "MOSFET-based Joule Thief steps up voltage," Published on Feb. 23, 2015, retrieved from the Internet: URL:<https://www.edn.com/Pdf/ViewPdf?contentItemId=4438702>. 4 pages.

'instructables.com' [online]. "Joule Thief Low Voltage Battery Charger," Published on Feb. 3, 2015, [retrieved on Oct. 8, 2018], retrieved from the Internet: URL:<https://www.instructables.com/id/Joule-Thief-Low-Voltage-Battery-Charger/>. 12 pages.

'madscientisthut.com' [online]. "Make a Joule Thief Battery Charger," Published on Jan. 19, 2011, [retrieved on Oct. 8, 2018], retrieved from the Internet: URL:<http://madscientisthut.com/wordpress/daily-blog/make-a-joule-thief-battery-charger/>. 3 pages.

'nfarl.org' [online]. "Joule Thief—Detailed Construction," Published on or before Oct. 1, 2018, [retrieved on Oct. 8, 2018], retrieved from the Internet: URL:<https://www.nfarl.org/kits/jouleThief/Joule_Thief_Detailed_Construction.pdf>. 8 pages.

'overunity.com' [online]. "Topic Second Stage Joule Thief Circuits," Published on or before Nov. 24, 2009,[retrieved on Oct. 5, 2018], retrieved from the Internet: URL<http://overunity.com/8334/second-stage-joule-thief-circuits/195/4.WSXpguvyvcc>. 10 pages.

Ragan, "Vampire Flashlight," Published on Jun. 5, 2014, [retrieved on Oct. 5, 2018], retrieved from the Internet: URL:<http://makezine.com/projects/vampire-flashlight/>. 21 pages.

Smith, "Joule Thief Battery Charger: Bring Back the "Dead"" Published on Feb. 3, 2015, [retrieved on Oct. 5, 2018], retrieved from the Internet: URL:<http://makezine.com/projects/joule-thief-battery-charger>. 12 pages.

Winowiecki, "Zombie Flashlight," Published on Jan. 6, 2014, [retrieved on Oct. 5, 2018], retrieved from the Internet: URL:<http://makezine.com/projects/make-37/zombie-flashlight/>. 23 pages.

'youtube.com' [online]. "Joule Thief with multiple Secondaries Explanation Part 4 Diagram," Published on Aug. 18, 2009, [retrieved on Oct. 9, 2018], retrieved from the Internet: URL:<https://www.youtube.com/watch?v=BztnQB2sgg0>. 9 pages (Video Submission).

* cited by examiner

OSCILLATING DRIVER CIRCUITS

BACKGROUND

The present specification relates to driver circuits, including circuits that supply power to loads using low-powered voltage sources.

Some types of driver circuits receive a voltage from a source and provide an output voltage that is higher than the voltage of the source. A variety of devices, such as light emitting diodes (LEDs), other batteries, and motors may be powered by a driver circuit.

SUMMARY

In some implementations, a small, low-cost driver circuit can be configured to oscillate in order to extract energy from very low-power or nearly depleted energy sources. For example, the driver circuit can induce voltage and current oscillations in order to step up voltage from a few volts or less of direct current to pulses of much higher voltage. This can allow the driver to extract energy to drive lighting elements such as LEDs and to charge batteries using oscillating or pulsing outputs, even when the power source is a single-cell battery or even a nearly depleted battery.

In general, some driver circuits can step up voltage provided by an input source to provide an output. One example of such a driver circuit is a booster circuit. One example of a booster circuit referred to as "a joule thief" can charge an LED coupled to ground on a load output using a low powered or nearly depleted input source. The benefit of a joule thief circuit is in its ability to power the LED when the input source does not include enough voltage alone to power the LED. The joule thief circuit utilizes the low-powered input voltage source, a transformer, and a transistor to generate a series of rapid pulses of voltage to power the LED to produce light.

Unlike typical joule thief circuits where the LED or other load is place between a transformer winding and a ground terminal, driver circuits as discussed in this application can include an LED or other load connected between a collector of the transistor and a positive terminal of the input source. Typical joule thief circuits have a LED or other load connected in parallel across a transistor, e.g., connected from a collector of a BJT transistor to ground so that the LED or other load provides an alternate path to ground (or negative terminal of the source) when the transistor is off. By contrast, the driver circuits discussed in this application can have an LED or other load connected in parallel with a transformer winding, e.g., so that current flowing out of the transformer winding at an output node of the winding is forced through the LED or other load back to an input node for the transformer winding. The input node for the transformer winding can be coupled to the voltage source for the driver circuit, even with one or more elements providing a connection between the input nodes of the other transformer winding. These features and other differences from traditional joule thief circuits will be apparent from the figures, description, and claims.

An efficient use of this driver circuit is its ability to utilize a nearly depleted or low-powered input source to charge a depleted battery in series with an LED connected on the load. Other devices may be connected on the load output in addition to or in replace of the depleted battery in series with the LED.

In some implementations, a device includes a transformer to convert a DC input to a direct current (DC) voltage output at a higher voltage level. The device includes a source, a transformer, a transistor, such as a bipolar junction transistor (BJT), and an output load. The DC source is connected in parallel with the transformer and the BJT. The transformer may be connected in series with the BJT. Additional BJTs may be connected in parallel to the nodes of the transformer. The load may include one or more LEDs, motors, and/or batteries for charging. The DC voltage source provides a DC current to the transformer windings as the BJT switches between ON and OFF modes. The DC current travels between the primary and secondary winding to induce an electromagnetic field (EMF) in both windings of the transformer. As the BJT switches to the OFF mode, the device provides an output voltage to a load as a result of the induced EMF in the transformer windings.

Implementations of the circuits and devices discussed in the application can provide a number of advantages. For example, the device can utilize a low-powered DC voltage source to provide a high output voltage, the device can generate a separate power supply when the BJT switches to the OFF mode, and the device can further improve overall circuit efficiency when limited power resources are available. Two or more transformer windings may be connected in parallel so that the DC current flows from one transformer winding through another to power various loads. Examples of various loads include, for example, a DC motor, a DC battery, an LED, a cellular device, and a smart watch. In some implementations, the device includes the ability to power various loads in parallel using a low powered DC voltage source. The use of the transformers and the BJT provide a way to increase the presence of voltage when the DC voltage input is low or near zero.

In a general aspect, a device includes: first terminals to couple with a first battery arranged to supply power to the device, the first terminals including a positive terminal for coupling with a positive contact of the first battery and a negative terminal for coupling with a negative contact of the first battery; a first winding and a second winding that are arranged to be inductively coupled; a transistor having a base, an emitter, and a collector, wherein the base is coupled to the positive terminal through the first winding, the collector is coupled to the positive terminal through the second winding, and the emitter is coupled to the negative terminal, wherein the first winding and the second winding are coupled to the positive terminal with opposite polarity; a light emitting diode (LED); and second terminals to couple with a second battery to be charged by the device, wherein the device is arranged to couple the LED and the second battery in series with each other, with the LED and second battery being coupled in parallel with the second winding, and wherein the LED is arranged to be reverse biased with respect to the first battery and the second battery.

In some implementations, the device includes a second LED arranged in parallel to the LED, the second LED being reverse biased with respect to the first battery and the second battery.

In some implementations, the device includes a switch that, when open, disconnects the positive terminal from the first winding and the second winding.

In some implementations, the device includes a second transistor having a base, an emitter, and a collector, wherein the base of the second transistor is coupled to the positive terminal through the first winding, the collector of the second transistor is coupled to the positive terminal through the second winding, and the emitter of the second transistor is coupled to the negative terminal.

In some implementations, the device includes a flashlight housing, wherein the battery, the second battery, the first winding, the second winding, the transistor and the LED are located in the flashlight housing, wherein the LED is arranged to emit light from the flashlight housing.

In some implementations, the LED is arranged to emit light when the second battery is being charged, and to not emit light when the second battery is not being charged.

In some implementations, the device is configured to oscillate in a manner that switches the transistor on and off at a rate of between 10 kHz and 500 kHz.

In some implementations, the device includes a third winding, a third battery, and a second LED that form an electrical loop, and the third winding arranged to be inductively coupled with the first winding and the second winding.

In some implementations, the third winding has a same polarity as the first winding.

In some implementations, the loop is electrically coupled to device only through inductive coupling of the third winding with the first winding and second winding.

In some implementations, the device does not include an electrical return path through the LED to the negative terminal except through the transistor.

In some implementations, the device excludes resistors in a path from the positive terminal to the first winding and second winding.

In some implementations, the device includes a potentiometer arranged in series with the first winding, with the potentiometer coupled between the positive terminal and the first winding, and the second winding is coupled in parallel to the first winding and the potentiometer, such that the second winding is not coupled to the positive terminal through the potentiometer.

In some implementations, the device includes an electrically controlled switch configured to start or stop oscillation of the device; and a controller configured to turn on the electrically controlled switch.

In some implementations, the device includes multiple LEDs arranged in parallel, each of the multiple LEDs being coupled between the collector of the transistor and a positive terminal of the second battery, each of the multiple LEDs being reverse biased with respect to the first battery and the second battery.

In some implementations, the first winding and the second winding are arranged in one or more flexible or resilient coils.

In some implementations, the device comprises a housing that includes the transistor and an area to receive a battery, wherein the first winding and the second winding extend out of the housing, the first winding and the second winding defining an open area to admit objects through the first winding and the second winding.

In some implementations, the device includes an electronically controlled switch configured to connect or disconnect a path between the first battery and the transistor to enable or disable oscillation using the transistor, the electronically controlled switch arranged to vary the charging rate of the second battery.

In some implementations, the device includes a temperature sensor, wherein the electronically controlled switch is configured to pause charging of the second battery in response to a signal from the temperature sensor.

In some implementations, the device is configured to provide pulses to charge the second battery that have a voltage that is more than three times the voltage of the first battery. Depending on the implementation, the peak voltage of the pulses may be, for example, approximately 3, 5, 10, 20, 30, 40, or 50 times the voltage of the first battery.

The details of one or more implementations of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
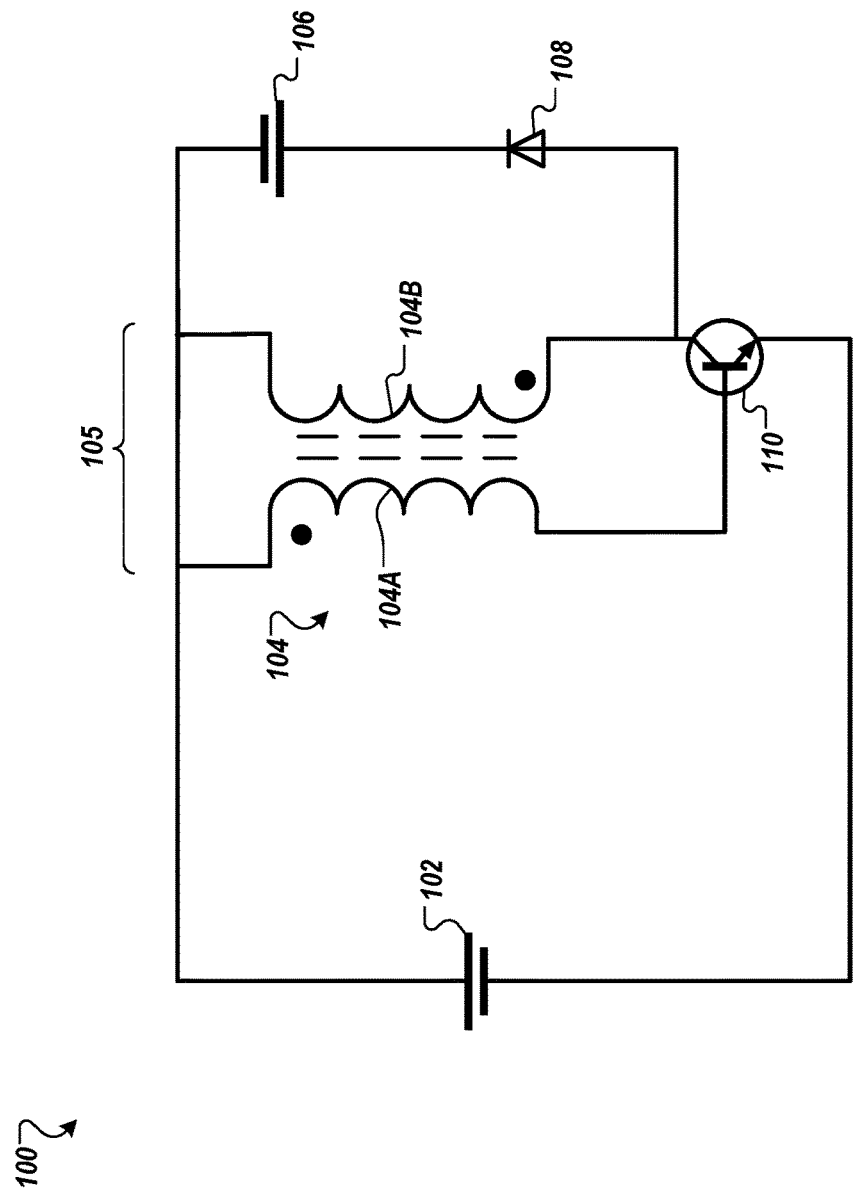
FIG. 1 is a diagram of an example oscillating circuit.

FIG. 1 is a diagram of an example oscillating circuit 100. The circuit 100 includes a DC source 102, a transformer 104, a transistor 110, an LED 108, and a battery 106. The circuit 100 is configured to charge the battery 106 and power the LED 108 to produce light with pulses generated through oscillation of the transistor 110 on and off.

The direct current (DC) source 102 has a positive and negative terminal. The DC source 102 can be any appropriate DC source, such as a battery (which may be fully charged or nearly depleted), low power source, such as a thermoelectric generator, a small turbine, a piezoelectric generator, a fuel cell, one or more solar cells, and so on. For example, the DC source 102 can be an alkaline battery, a NiMH battery, a Li-ion battery, a NiCad battery, at any appropriate voltage level, (e.g., from a nominal voltage of roughly 1.2V, 1.5V, 2V, 5V, 9V, etc. and at any state of charge resulting in an output voltage).

The transistor 110 turns on and off to generate oscillating or pulsing output in the load. The transistor 110 may be a bipolar junction transistor (BJT). Other types of transistors may be used, for example, such as a field-effect transistor (FET). In circuit 100, an output node of a primary winding 104A of the transformer 104 is coupled to a base of the transistor 110. An output node of a secondary winding 104B of the transformer 104 is coupled to a collector of the transistor 110. An emitter of the transistor 110 is coupled to the negative terminal of the DC source 102, e.g., DC ground for the circuit 100.

The transformer 104 is coupled to the positive terminal of the DC source 102. Transformer 104 may include two or more windings, such as a primary winding 104A and a secondary winding 104B. Each of the windings 104A, 104B can have an input end or node configured to receive the positive voltage of the DC source 102. The primary winding 104A has one end coupled to the positive terminal of the DC source 102 and the other end coupled to the base of the transistor 110. The secondary winding 104B has one end coupled to the positive terminal of the DC source 102 and the other end coupled to the collector of the transistor 110. The ends of the windings 104A, 104B that are coupled to the positive terminal of the DC source 102 may be coupled together, e.g., by a wire 105.

The DC source 102 provides DC current and DC voltage to pass through the primary winding 104A and secondary winding 104b of the transformer 104. When current changes in one of the windings a varying magnetic field is generated which induces an electromotive force (EMF) and current in the other winding. The varying magnetic field created by the primary winding 104A creates an induced EMF of roughly the same magnitude in the secondary winding 104b. However, due to the connection and/or physical arrangement of the windings 104A, 104B, the direction that EMF and current is induced is opposite. That is, when current flows through the winding 104b, e.g., from the DC source 102 to the collector of the transistor 110, the induced EMF in the primary winding 104A induces current away from the base of the transistor and with an EMF opposing the voltage produced by the DC source 102.

In circuit 100, a load is connected in parallel to the secondary winding 104b and the transistor 110. The load includes a battery 106 and an LED 108 connected in series. The circuit 100 is configured to provide output pulses to the load, frequently at a frequency between about 5 kHz and 500 kHz depending on the components selected. The output pulses turn on the LED 108 to produce light and also charge the battery 106. Although circuit 100 includes a battery 106 and an LED 108, the circuit 100 may be used to provide power to other loads in addition to or instead of the battery 106 and the LED 108. For example, other loads may include one or more other LEDs and/or other devices for charging. In general, the load includes at least one diode element that is arranged in the direction of LED 108, e.g., reverse biased with respect to the DC source 102 and any series connected battery to be charged.

The circuit 100 can be used to power LEDs, power sources, and other devices in various applications. For example, the circuit 100 can be used to charge a battery in devices such as a cell phone, a smart watch, a key fob, or a fan, to name a few examples. The circuit 100 can also be used to power LEDs, such as LED 108, to act as or power a flashlight and provide various spectra of light. The circuit 100 may include various LEDs in the load that output different spectrum of light that generate light brighter than a single LED.

Notably, the load (e.g., LED 108 and battery 106) is connected between the output of the secondary winding 104B (e.g., the collector terminal of transistor 110) and the input to the secondary winding 104B (e.g., the positive terminal of the DC source 102). Current flowing through the load flows back through the transformer 104 and/or the DC source 102. This is different from conventional joule thief circuits that simply route the load to ground or negative terminal of the source. The arrangement illustrated can provide a number of advantages. For example, it can increase the longevity of charge of a battery used as a DC source 102, as energy is fed back into the circuit 100. Also, in this arrangement, output pulses act against the voltage potential provided by the DC source 102, which helps reduce the sometimes large voltage spikes across the load that occur due to oscillation when compared with traditional joule thief circuits. This can reduce component tolerance requirements and increase safety of charging the battery 106. Further, the arrangement allows for a wider range of voltage sources for the DC source 102. That is, a source voltage large enough to turn on the LED in a traditional joule thief circuit could potentially bypass the transistor and turn on the LED in a steady state in some circumstances. In the illustrated arrangement, even a source voltage at or somewhat above the turn on voltage of the LED 108 would not keep the LED 108 on in a steady state.

In operation, oscillation is induced in the circuit as the transistor 110 turns on and off as a result of changing currents through the windings 104A, 104b of the transformer.

The transistor 110 initially starts being turned off, e.g., in the cut-off operating region. The cut-off mode for a BJT may include little or no current flowing to the base, minimal or no current flowing from collector to emitter, and the voltage drop across the base to the emitter of the BJT is less than 0.7 volts. As a result, the transistor 110 appears as an open circuit between the collector and emitter channel to the DC source 102.

The DC source 102 provides a voltage which causes current to flow to the transformer 104. The collector-emitter path of the transistor 110 initially appears as an open circuit to the DC source 102. Before the transistor turns on, all DC current from the source 102 initially flows down the primary winding 104A to the base of the transistor 110. The voltage transmitted through the primary winding 104A provides a sufficient base-emitter difference to turn on the transistor 110. As the DC source 102 continues to provide current to the base of the transistor 110, the transistor 110 will begin to move from operation in the cut-off region to the saturation region. In this instance, the DC source 102 may provide a sufficient amount of current to the base of the transistor 110 through the primary winding 104A such that a voltage between the base and emitter is greater than roughly 0.7 volts, or whatever threshold is needed to operate the transistor in saturation. Additionally, the DC current flowing to the base of the transistor 110 will increase past zero amperage. Once these two conditions are met, the transistor 110 transitions from the cut-off region to operation in the saturation region. As such, the base current is high enough that the base to emitter becomes forward biased, which now causes significant DC current provided by the DC source 102 to be provided through secondary winding 104B (e.g., much more than the current through the base-emitter path). Thus, the transistor 110 begins to pass current through the collector and the emitter, allowing increasing currents to pass through the secondary winding 104B and into the collector terminal of the transistor 110.

Once in the saturation region, the collector to emitter channel in the transistor 110 is completely open. As a result, the transistor 110 can allow a maximum amount of current to travel through the collector to emitter channel as allowed by the characteristics of the transistor 110. Therefore, once the transistor 110 fully enters the saturation region, the amount of current flowing through the secondary winding 104B to the collector to emitter channel is dictated by the maximum amount of current as allowed by the characteristics of the transistor 110. For example, the characteristics of the transistor 110, such as a BJT, depend on an alpha and beta value, where the beta value generally ranges from 20 to 200. The collector current may be a factor of the beta value and the base current. The remainder of the current provided by the DC source 102 flows through the primary winding 104A to the base of the transistor 110.

The current flowing through the secondary winding 104B to the collector terminal of the transistor 110 induces an electromagnetic field (EMF) in the primary winding 104A. The polarity of the induced EMF, as indicated by the relative positions of the dots shown adjacent to the primary winding 104A and the secondary winding 104B, will be opposite between the windings. For example, as shown in FIG. 1, the significant increases in current from the DC source 102 to the transistor 110 through the secondary winding 104B will oppose or reduce current flowing from the DC source 102 to the transistor 110 through the primary winding 104A.

The EMF induced in the primary winding 104A reduces the voltage that appears at the base of the transistor 110. In other words, the induced EMF subtracts from the voltage potential provided by the DC source 102 so the voltage at the base is lower than the voltage of the DC source 102. The voltage at the base decreases until the transistor 110 is no longer active and returns to operation in the cut-off region. However, the transistor 110 turns off while significant current is flowing through the secondary winding 104B, and that current cannot change instantaneously. The current is thus directed not through the transistor 110 but through the load, e.g., the path including the LED 108 and the battery 106, as an output pulse significantly greater than the voltage of the DC source 102. The secondary winding 104B discharges the energy it stored and its magnetic field collapses. This ends the cycle, and with the transistor 110 operating in the cut-off region, the cycle rapidly begins again.

In further detail, at the beginning of a cycle, the transistor 110 may transition from the cut-off region to the saturation region in a rapid manner. The DC source 102 may supply a sufficient amount of current to the base of the transistor 110 such that the transistor 110 rapidly switches from the cut-off region to the saturation region. Once in the saturation region, the collector to emitter channel in the transistor 110 looks like a closed circuit for current to flow.

In some implementations, the amount of current flowing through each of the windings may be determined by an inductance for each of the windings. For example, the following equation shows an example of the induced EMF or voltage in each of the windings as a factor of the inductance and the change in the current:

$$EMF = v = L * \frac{di}{dt} \quad (1)$$

The induced EMF as shown in equation (1) is the magnitude of the voltage generated in each of the primary winding 104A and the secondary winding 104B. Although a particular amount of current may be allowed to flow through the collector to emitter channel of the transistor 110, the inductance in each of the windings may be a limiting factor in determining the rate at which current flows through that branch of the transformer 104. For example, if the collector to emitter channel of the transistor 110 allows a current equal to 1 milliamp (mA) to flow through but the secondary winding 104B allows 0.5 mA per millisecond, then that branch of circuit 100 will not reach 1 mA until at least 2 milliseconds have passed.

In some implementations, after the transistor 110 reaches the saturation region, the transistor 110 may switch back to the cut-off region in a rapid manner. As current through the secondary winding 104B increases to the point that the voltage at the base can no longer keep the transistor 110 active, the collector to emitter path closes, transitioning back to the cut-off region.

In some implementations, the stored energy in the secondary winding 104B needs to dissipate stored energy. The secondary winding 104B becomes a voltage source with the stored energy as its supply voltage. The secondary winding 104B provides the supply voltage to the load. The secondary winding 104B and the load now exist in a closed circuit due to the fact that the collector to emitter channel appear as an open circuit because the transistor 110 is turned off. The secondary winding 104B forces the stored energy to the load such that the individual voltage drops across each of the load components, i.e., the LED 108 and the battery 106.

In some implementations, the placement of the LED 108 ensures current does not flow in a clockwise direction from the top of the transformer 104 through the battery 106 to the collector of the transistor 110. In fact, in this instance of circuit 100, current can only flow from the output node of the secondary winding 104B through LED 108 to a positive terminal of the battery 106 and out the negative terminal of the battery 106, thus charging the battery 106. The placement of the LED 108 ensures current cannot flow in the clockwise direction which could potentially cause damage to the transistor 110.

In some implementations, the circuit 100 repeats the process mentioned above after the energy stored in the secondary winding 104B is output to the load. The circuit 100 starts the process of turning on the transistor 110 by supplying DC current to the base of the transistor 110 through the primary winding 104A of the transformer 104. In some implementations, this process repeats itself in rapid succession. One step of the oscillation includes the transistor 110 from the cut-off region to the saturation region and increasing current through the secondary winding 104B. Another step of the oscillation includes switching the transistor 110 from the saturation region to the cut-off region as the EMF induced in the primary winding 104A no longer supports operation in the saturation region. Because the transistor 110 turns off very quickly and current through an inductor cannot change as quickly, the secondary winding 104B causes current to be provided through the only available path, through the load connected from the collector of the transistor 110 to the input node of the secondary winding 104B. The discharge of the energy in the secondary winding 104B is accompanied by a collapse of the magnetic field of the secondary winding 104B.

In some implementations, this oscillation may occur at a rapid rate. For example, this oscillation process may occur rapidly at a rate of 10 kHz to 100 kHz, or between 5 kHz and 500 kHz. The oscillation rate may depend on the voltage and current values provided by the DC source 102, the maximum inductance in each of the primary winding 104A and the secondary winding 1046, the turn-on/turn-off voltage of the transistor 110, an arrangement of the various components in the load, and the various components in the load themselves.

In some implementations, the LED 108 may blink its light at the oscillation rate of the circuit 100. For example, if the load of the circuit 100 includes an LED, such as LED 108, the LED in the load may blink at a rate of the oscillation rate, such as 50 KHz. As mentioned above, other oscillation rates are possible on a variety of factors. On average, the human eye can only perceive a visual rate anywhere between 30 Hz to 60 Hz and therefore would not be able to visualize the oscillation rate of the circuit 100.

The arrangement of the load in the circuit 100 is shown for purposes of example, and may include more or fewer components than are illustrated. Many variations are possible, as discussed with respect to the load below.

Figure 2:
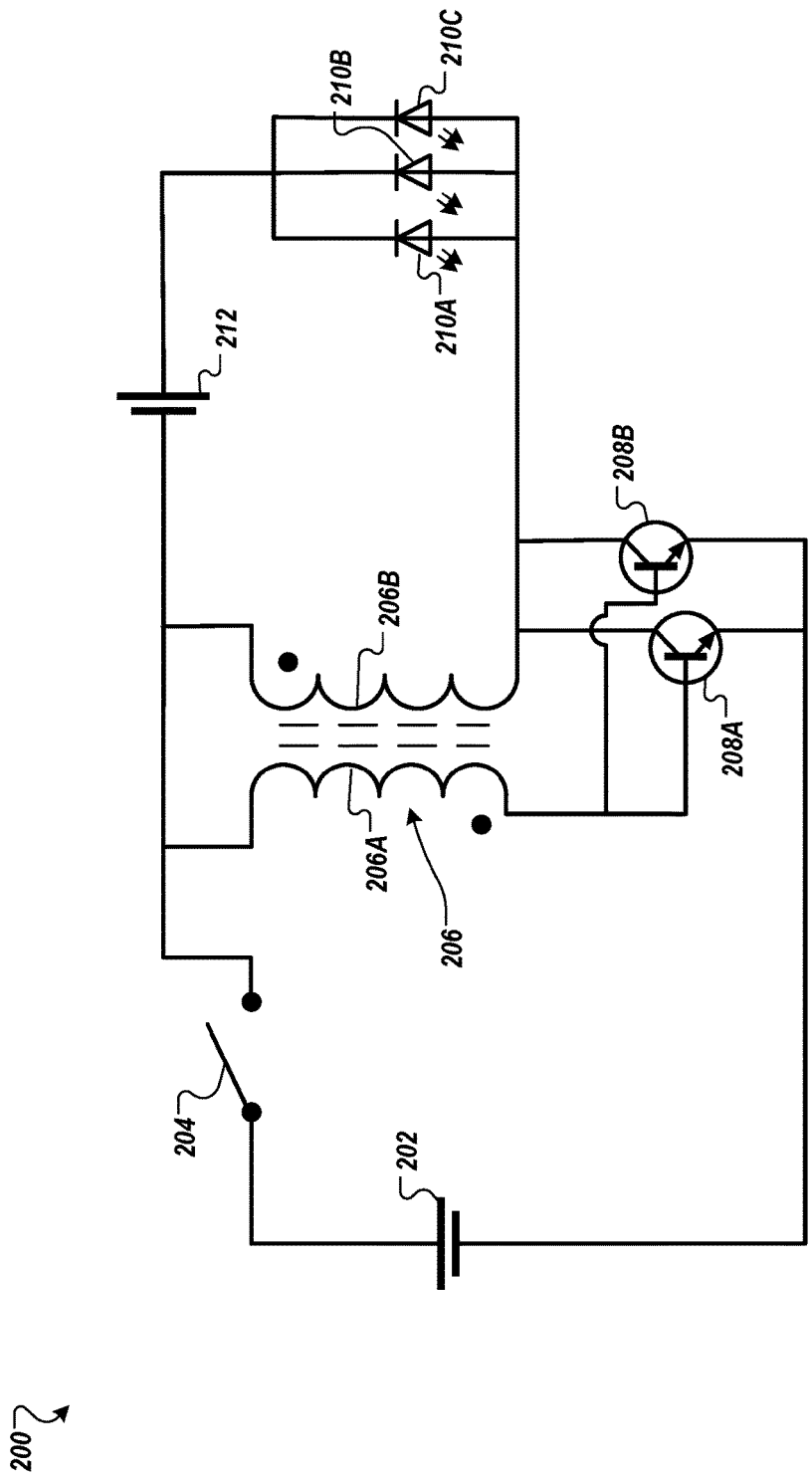
FIG. 2 is a diagram of another example of an oscillating circuit.

FIG. 2 is a diagram of an example oscillating circuit 200 that can power multiple loads including a source. The circuit 200 includes a DC voltage source 202, a switch 204, a transformer 206 with a primary winding 206A and a secondary winding 206B, a first transistor 208A, a second transistor 208B, LEDs 210A-210C, and a battery 212.

Circuit 200 operates in a manner similar to circuit 100 illustrated in FIG. 1. The various components of circuit 200 that differ from circuit 100 will be discussed below.

The circuit 200 is a circuit configured to efficiently power multiple LEDs in parallel and charge a battery. The circuit 200 is configured to turn on LEDs 210A-210C to produce light. In some implementations, each of the LEDs 210A-210C may produce a different spectrum of light, e.g., different colors of light. Alternatively, each of the LEDs 210A-210C may produce a similar spectrum of light. The parallel arrangement of the first transistor 208A and the second transistor 208B allows for distribution of heat generation, facilitation of repairs and replacements of parallel components, such as either one of the transistors or one of the LEDs, and ensures the voltages at the collection junctions of each transistor is high enough to light each of the multiple LEDs 210A-210C.

In some implementations, each of the LEDs 210A-210C may have different turn-on voltages. For example, LED 210A may be a red LED, LED 210B may be a blue LED, and LED 210C may be a green LED. The red LED may require a turn on voltage of 1.8 volts, the blue LED may require a turn on voltage of about 3.2 volts, and the green LED may require a turn on voltage of 2.0 volts. LEDs of various colors with various turn-on voltages may provide a visual indication to a user whether different minimum output levels of the circuit 200 have been achieved. They can also help distribute load and reduce heat for high output scenarios.

Circuit 200 is configured to provide power to multiple loads in parallel including LEDs 210A-210C and the battery 212, but the circuit 200 may be used to provide power to other loads in addition to or instead of LEDs and the voltage source.

The DC source 202 and the transformer 206 perform functions similar to that of the DC source 102 and the transformer 104. The circuit 200 includes a switch 204 in series with the DC source 102 and the transformer 206. By changing the position of the switch 204, a user can open or close the portion of the circuit 200 connecting the DC source 202 to the transformer 206. For example, a user may use the switch 204 to stop the oscillation of the circuit 200.

In some implementations, the output generated by circuit 200 will be provided across the LEDs 210A-210C and a battery 212. The current will flow across the LEDs 210A-210C to produce light. The current will also charge the battery 212. If the switch 204 remains in the OFF position during this time, the LEDs 210A-210C will produce light and the battery 212 will be charged until the stored energy from the secondary winding 206B has totally discharged across the LEDs 210A-210C and the battery 212. Once the switch 204 is moved to the ON position, the oscillation process repeats itself to begin powering the transformer 206 and subsequently the LEDs 210A-210C and the battery 212.

In some implementations, the positive terminal of the battery 212 may be coupled to the output of the LEDs 210A-210C and the negative end of the battery 212 may be coupled to the top of the transformer 206. In some implementations, output voltage will be dropped across the LEDs 210A-210C to produce light, and remaining voltage may be dropped across the battery 212 for charging purposes. In this example, the current pulse output by the secondary winding 206B will charge the battery 212 as the current pulse enters the positive terminal of the battery 212.

As the secondary winding 206B dissipates the induced EMF through the LEDs 210A-210C and across the positive and negative terminals of the battery 212, the battery 212 charges with a voltage of the output pulse voltage minus (i) the voltage drop across the parallel LEDs 210A-210C and (ii) the voltage of the source 202. For example, if the output pulse has a voltage of 10 volts and the voltage drop across the parallel LEDs 210A-210C is equal to 3 volts and the voltage source 202 has a voltage of 1 volt, then the voltage drop across the battery 212 is equal to 6 volts.

In some implementations, the circuit 200 repeats the oscillation process at a high rate, such as at a rate of 50 KHz, to provide another voltage and current pulse to the LEDs 210A-210C and to the battery 212. The oscillation process repeats such that an induced EMF from the secondary winding 206B is provided at every cycle of the oscillation rate. Thus, the circuits 100 and 200 provide a voltage and current pulse to the load at each cycle or pulse of the oscillation rate.

The switch 204 may be controlled by a user manually, or the switch 204 may be coupled to a controller that activates the switch at predetermined times or in response to certain conditions, as discussed above. In some implementations, the switch 204 may affect the charging of the battery 212. For example, the user may turn the switch 204 to the OFF position once the battery 212 is adequately or completely charged. In another example, the user may vary the position of switch 204 to regulate a voltage amount applied to the LEDs 210A-210C and the battery 212 from the induced EMF. For example, switch 204 may be an electronically controlled switch 204 that alternates between the OFF and ON positions to vary the charging rate. For example, a temperature sensor can monitor the temperature of the battery 212 being charged and pause charging or introduce periods without charging to allow the battery 212 to cool and charge safely.

Figure 3:
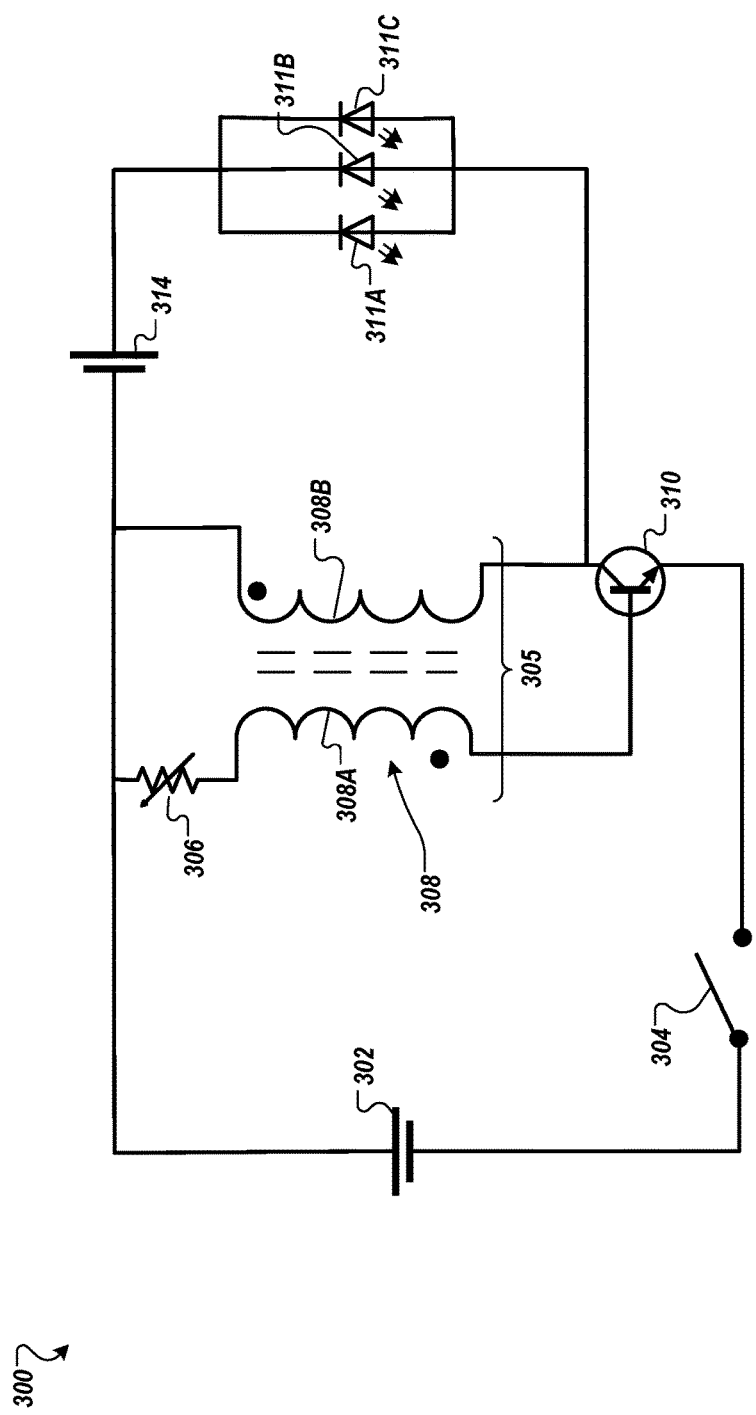
FIG. 3 is a diagram of another example of an oscillating circuit.

FIG. 3 is a diagram of an example oscillating circuit 300 that can vary a rate of powering multiple loads including a voltage source. The circuit 300 includes a DC voltage source 302, a switch 304, a potentiometer 306 (or other component or network providing a variable impedance), a transformer 305 with a primary winding 308A, a secondary winding 308B, a transistor 310, LEDs 311A-311C, and a battery 314.

Circuit 300 operates in a manner similar to circuits 100 and 200 of FIGS. 1 and 2. Various aspects of circuit 300 that differ from circuit 200 will be discussed below.

The circuit 300 is a circuit configured to efficiently power multiple LEDs in parallel and charge a voltage source at a rate designated by the potentiometer 306. The circuit 300 is configured to turn on LEDs 311A-311C to produce light. Each of the LEDs 311A-311C may produce a different spectrum of light. Also, the circuit 300 is configured to charge a battery 314. The battery 314 may include a depleted or low voltage source in need of charging. For example, the battery 314 may be in need of charging for various applications. The applications may be for a television remote, a cell phone, or a flashlight, to name a few examples. The circuit 300 may also include a potentiometer 306 with a varying resistance value to affect the oscillation rate of the circuit. While circuit 300 is configured to provide power to multiple loads in parallel including LEDs 311A-311C and the battery 314, the circuit 300 may be used to provide power to other loads in addition to or instead of LEDs and the voltage source.

The switch 304 performs functions similar to switch 204. Unlike switch 204, which is coupled to the positive terminal of the source 202, the switch 304 is coupled to the negative terminal of the source 302.

In some implementations, the potentiometer 306 may be an adjustable component that has a variable resistance value, and the selected resistance can determining how much current is let through to the primary winding 308A of the transformer 308. For example, the potentiometer 306 may include a linear device, a rotating device, a sliding device, or a digital potentiometer to vary a resistance value. A user may adjust the power delivered to the components of the circuit 300 by varying the resistance value of the potentiometer 306 ranging from completely on to completely off. For example, the potentiometer 306 may range in resistance values from 0 to 10 kilo-ohms (kohms). A user may vary the brightness of the LEDs 311A-311C, vary the oscillation rate of the circuit 300, and vary the rate at which the battery 314 is charged as a result of a user varying the resistance of the potentiometer 306.

In some implementations, the potentiometer 306 may be placed in other places in circuit 300. For example, the potentiometer 306 may be coupled to the base of the transistor 310 to vary the current entering the base. In another example, the potentiometer 306 may be coupled to the collector of the transistor 310 to vary the current entering the collector and passing through the collector to emitter channel of the transistor 310.

Figure 4:
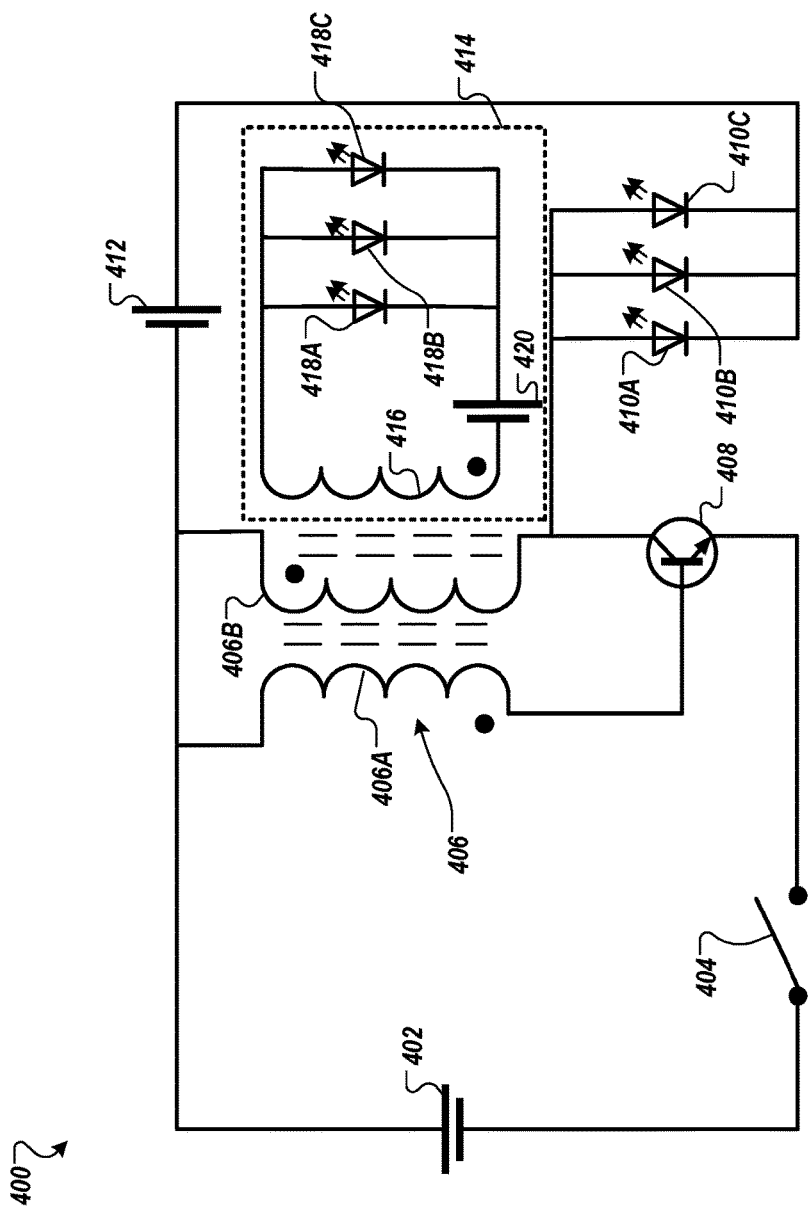
FIG. 4 is a diagram of an example of an oscillating circuit that has multiple secondary windings for powering multiple loads.

FIG. 4 is a diagram of an example oscillating circuit 400 that can power multiple loads using multiple transformer windings. The circuit 400 includes a DC voltage source 402, a switch 404, a transformer 406 with a primary winding 406A, a secondary winding 406B, a transistor 408, LEDs 410A-410C, a battery 412, and a secondary isolated circuit 514. The secondary isolated circuit 414 includes a tertiary winding 416, LEDs 418A-418C, and a source 420.

In some implementations, circuit 400 is similar to circuit 300 in FIG. 3 and circuit 200 in FIG. 2. The various components of circuit 400 that differ from circuit 300 and circuit 200 will be discussed below.

The circuit 400 is a circuit configured to perform a variety of actions. In one action, the circuit 400 is configured to power multiple LEDs in parallel coupled to a point at a load where the collector of the transistor 408 and the secondary winding 406B meet. In another action, the circuit 400 is configured to power a battery 412 connected in series to the multiple LEDs. In another action, the circuit 400 is configured to induce in parallel an EMF in a tertiary winding 416 that powers a battery 420 and multiple LEDs 418A-418C.

In some implementations, the circuit 400 is configured to turn on LEDs 410A-410C in a similar manner to circuit 300 powering LEDs 311A-311C. In some implementations, each of the LEDs 410A-410C may produce a different spectrum of light or a similar spectrum of light. These LEDs 410A-410C may be used in applications such as camera flashes, flashlights, or traffic signals, to name a few examples.

In some implementations, the circuit 400 is configured to power the battery 412 in a similar manner to circuit 300 charging battery 314. The battery 412 may include a depleted or low voltage source in need of charging. For example, the battery 412 may be a battery in need of charging for any of various applications.

In some implementations, the circuit 400 is configured to power a secondary electrically isolated circuit 414. The secondary isolated circuit 414 is coupled to the secondary winding 406B so that current through winding 406B generates an induced EMF in the tertiary winding 416. As mentioned above, the current flowing through the secondary winding 406B to the collector of the transistor 408 also induces an EMF in the primary winding 406A. Likewise, the same current flowing through the secondary winding 406B to the collector of the transistor 408 induces an EMF in the tertiary winding 416. The induced EMF in both the primary winding 406A and the tertiary winding 416 may be equal in magnitude and opposite in polarity to the induced EMF generated in the secondary winding 406B (e.g., with a 1:1:1 turns ratio for the transformer 406).

In some implementations, in the secondary isolated circuit 414, current flows from the tertiary winding 416 in a counter-clockwise direction. For example, after the tertiary winding 416 generates an induced EMF, current flows from the tertiary winding 416, across the battery 420, across the LEDs 418A-418C, and back to the top of the tertiary winding 416. The LEDs 418A-418C may perform similar functions as the LEDs 410A-410C. In addition, battery 420 may be charged in a similar manner to that of battery 412.

Circuit 400 allows multiple depleted battery sources may be charged using a single source 402. By stacking multiple windings in parallel, such as the primary winding 406A, the secondary winding 406B, and the tertiary winding 416, the circuit 400 may provide an induced EMF to each winding in order to charge one or more depleted voltage sources, such as batteries 412 and 420. Additional circuits similar to circuit loop 414, each with a separate winding, may be inductively coupled in the same manner as circuit loop 414 to power one or more other devices or charge one or more other batteries. In some implementations, the polarity of each subsequent winding may be opposite from the previous winding, as displayed by the dot convention. For example, the dot polarity in circuit 400 alternate positions starting at the primary winding 406A, the secondary winding 406B, and the tertiary winding 416. The dot polarity indicates the relative polarities of the induced EMF or voltage for that respective winding as current flows through the windings.

In some implementations, the oscillation rate of the circuit 400 may be any of various rates, similar rate to the oscillation rates of circuits 100, 200, and 300 and transmit voltage and current pulses at each cycle to the batteries 412 and 420, LEDs 410A-410C, and LEDs 418A-418C.

Figure 5B:
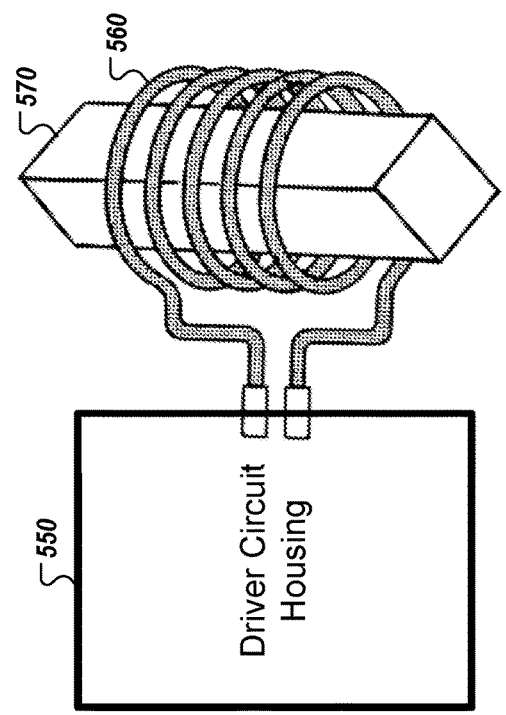
FIGS. 5A and 5B are diagrams that illustrate examples of transformer winding arrangements for oscillating circuits.
Figure 5A:
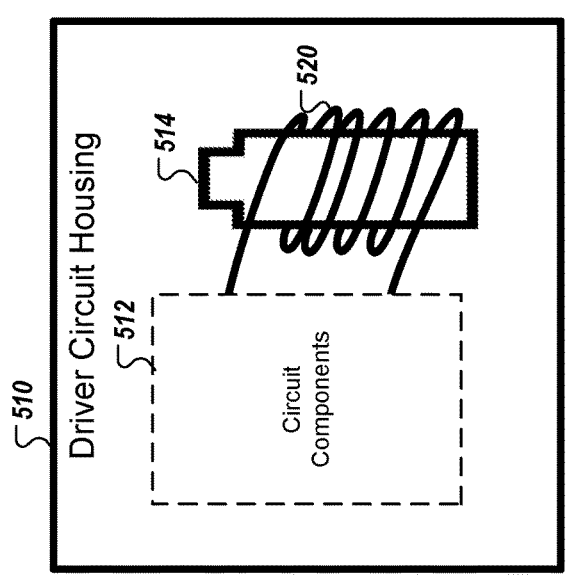

FIGS. 5A and 5B illustrate examples of circuit housings and transformer coils that can be used with any of the circuits 100, 200, 300, or 400. These figures each show a housing 510, 550 and a wire coil 520, 560 representing the coils of a transformer.

In FIG. 5A, driver circuit components 512 are arranged so that one or more batteries 514 can be placed to extend into or through the coils 520 of the transformer, with the batteries and coils being located within the housing 510. This can conserve space and allow a compact arrangement of the battery compartment within the transformer coils 520. In some implementations, the placement of the battery 514 (which could be acting as the battery to be charged or the battery acting as the DC voltage source) within the coils 520 can affect the inductance of the coils 520 and may positively affect the battery 514. During operation, electromagnetic fields grow and collapse and can affect objects located within the coils 520.

FIG. 5B shows an example where the transformer coils 560 extend out of the housing 550 of the circuit. In some implementations, the transformer coils 560 are made of flexible and/or resilient materials that can be expanded or reshaped to extend around different objects 570. For example, the inductor coils may be helical and resilient similar to a coiled telephone handset cord. The coil may be formed with a cable that includes multiple conductors, e.g., one for each winding of the transformer.

The arrangement of FIG. 5B can provide a number of advantages. The inductor coils can extend around one or more batteries, either does being charged or being discharged, which can alter or lower space requirements for the circuit and allow it to fit into different sized spaces. The ability to change the size and number of coils, and to change the object in the center, can allow easy adjustment of the inductance of the transformer, and thus change the properties of the circuit in an easy user-accessible way. In some cases, the increasing and decreasing electromagnetic fields provided by the coils 560 can provide a beneficial effect to one or more objects 570 placed within the coils 560.

A number of implementations have been described. Nevertheless, it will be understood that various modifications may be made without departing from the spirit and scope of the disclosure. For example, various operations discussed above may be used, with steps re-ordered, added, or removed.

While this specification contains many specifics, these should not be construed as limitations on the scope of the invention or of what may be claimed, but rather as descriptions of features specific to particular implementations of the invention. Certain features that are described in this specification in the context of separate implementations can also be implemented in combination in a single embodiment. Conversely, various features that are described in the context of a single embodiment can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

As used herein, components that are coupled together may be electrically connected in a manner that allows electrical communication between them. Thus coupled components may be connected directly, e.g., by a wire, solder, circuit board trace, or other conductor, or indirectly through one or more other intervening circuit components.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the implementations described above should not be understood as requiring such separation in all implementations, and it should be understood that the described components and systems can generally be integrated together in a single product or packaged into multiple products.

Particular implementations of the invention have been described. Other implementations are within the scope of the following claims. For example, the steps recited in the claims can be performed in a different order and still achieve desirable results.

What is claimed is:

1. A device comprising:
   first terminals to couple with a first battery arranged to supply power to the device, the first terminals including a positive terminal for coupling with a positive contact of the first battery and a negative terminal for coupling with a negative contact of the first battery;
   a first winding and a second winding that are arranged to be inductively coupled;
   a transistor having a base, an emitter, and a collector, wherein the base is coupled to the positive terminal through the first winding, the collector is coupled to the positive terminal through the second winding, and the emitter is coupled to the negative terminal, wherein the first winding and the second winding are coupled to the positive terminal with opposite polarity;
   a light emitting diode (LED); and
   second terminals to couple with a second battery to be charged by the device,
   wherein the device is arranged to couple the LED and the second battery in series with each other, with the LED and second battery being coupled in parallel with the second winding, and
   wherein the LED is arranged to be reverse biased with respect to the first battery and the second battery.

2. The device of claim 1, further comprising a second LED arranged in parallel to the LED, the second LED being reverse biased with respect to the first battery and the second battery.

3. The device of claim 1, further comprising a switch that, when open, disconnects the positive terminal from the first winding and the second winding.

4. The device of claim 1, further comprising a second transistor having a base, an emitter, and a collector, wherein the base of the second transistor is coupled to the positive terminal through the first winding, the collector of the second transistor is coupled to the positive terminal through the second winding, and the emitter of the second transistor is coupled to the negative terminal.

5. The device of claim 1, further comprising a flashlight housing, wherein the battery, the second battery, the first winding, the second winding, the transistor and the LED are located in the flashlight housing, wherein the LED is arranged to emit light from the flashlight housing.

6. The device of claim 1, wherein the LED is arranged to emit light when the second battery is being charged, and to not emit light when the second battery is not being charged.

7. The device of claim 1, wherein the device is configured to oscillate in a manner that switches the transistor on and off at a rate of between 10 kHz and 500 kHz.

8. The device of claim 1, further comprising a third winding, a third battery, and a second LED that form an electrical loop,
   wherein the third winding arranged to be inductively coupled with the first winding and the second winding.

9. The device of claim 8, wherein the third winding has a same polarity as the first winding.

10. The device of claim 8, wherein the loop is electrically coupled to device only through inductive coupling of the third winding with the first winding and second winding.

11. The device of claim 1, wherein the device does not include an electrical return path through the LED to the negative terminal except through the transistor.

12. The device of claim 1, wherein the device excludes resistors in a path from the positive terminal to the first winding and second winding.

13. The device of claim 1, further comprising a potentiometer arranged in series with the first winding, with the potentiometer coupled between the positive terminal and the first winding,
   wherein the second winding is coupled in parallel to the first winding and the potentiometer, such that the second winding is not coupled to the positive terminal through the potentiometer.

14. The device of claim 1, further comprising an electrically controlled switch configured to start or stop oscillation of the device; and
   a controller configured to turn on the electrically controlled switch.

15. The device of claim 1, comprising multiple LEDs arranged in parallel, each of the multiple LEDs being coupled between the collector of the transistor and a positive terminal of the second battery, each of the multiple LEDs being reverse biased with respect to the first battery and the second battery.

16. The device of claim 1, wherein the first winding and the second winding are arranged in one or more flexible or resilient coils.

17. The device of claim 1, wherein the device comprises a housing that includes the transistor and an area to receive a battery, wherein the first winding and the second winding extend out of the housing, the first winding and the second winding defining an open area to admit objects through the first winding and the second winding.

18. The device of claim 1, comprising an electronically controlled switch configured to connect or disconnect a path between the first battery and the transistor to enable or disable oscillation using the transistor, the electronically controlled switch arranged to vary the charging rate of the second battery.

19. The device of claim 18, further comprising a temperature sensor, wherein the electronically controlled switch is configured to pause charging of the second battery in response to a signal from the temperature sensor.

20. The device of claim 1, wherein the device is configured to provide pulses to charge the second battery that have a voltage that is more than three times the voltage of the first battery.

* * * * *